United States Patent [19]

Paucha

[11] 4,253,856
[45] Mar. 3, 1981

[54] FILTER ARRANGEMENT

[75] Inventor: Eugene Paucha, Montreal, Canada

[73] Assignee: American Air Filter Company, Inc., Louisville, Ky.

[21] Appl. No.: 92,679

[22] Filed: Nov. 9, 1979

[51] Int. Cl.³ .............................................. B01D 46/02
[52] U.S. Cl. ........................................ 55/374; 55/302; 55/379; 55/493
[58] Field of Search ...................... 55/302, 341 R, 374, 55/378–379, 493

[56] References Cited

U.S. PATENT DOCUMENTS

| | | | |
|---|---|---|---|
| 3,167,415 | 1/1965 | Edwards | 55/302 |
| 3,377,783 | 4/1968 | Young | 55/302 |
| 3,777,458 | 12/1973 | Dence | 55/379 X |
| 3,830,043 | 8/1974 | Nielsen et al. | 55/378 |
| 3,856,489 | 12/1974 | Vokral | 55/341 R X |
| 3,876,402 | 4/1975 | Bundy et al. | 55/379 X |

FOREIGN PATENT DOCUMENTS

| | | | |
|---|---|---|---|
| 2821447 | 5/1979 | Fed. Rep. of Germany | 55/379 |
| 887772 | 1/1962 | United Kingdom | 55/379 |
| 1081516 | 8/1967 | United Kingdom | 55/378 |

*Primary Examiner*—Kathleen J. Prunner
*Attorney, Agent, or Firm*—Thomas G. Anderson

[57] ABSTRACT

A filter installation for a filter housing including a header plate having an aperture of a predetermined diameter, a tubular filter, a venturi-like member extending through the aperture into one end of the filter, an annular shoulder on said member having an outermost diameter at least substantially the same as the diameter of the plate aperture, and a collar having an interior diameter less than the outermost diameter of the shoulder and surrounding the filter, said collar being releasably secured to the plate and retaining a portion of the filter between the plate and the collar to secure the filter to the plate.

10 Claims, 6 Drawing Figures

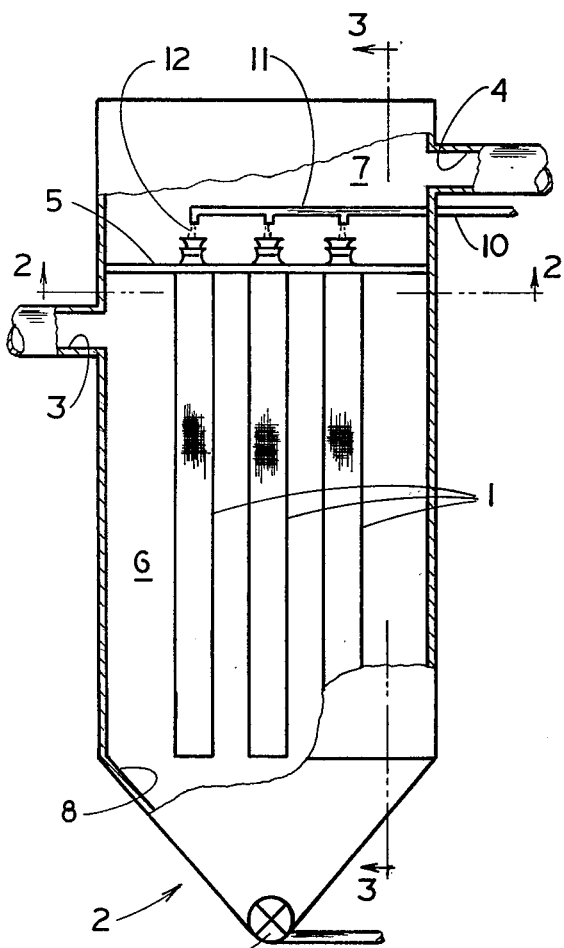
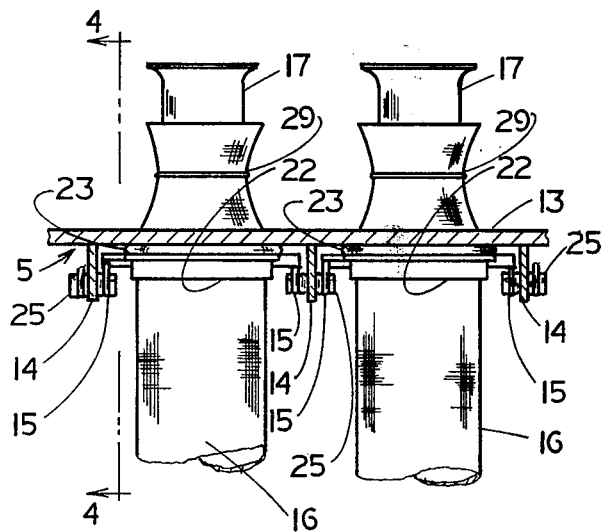
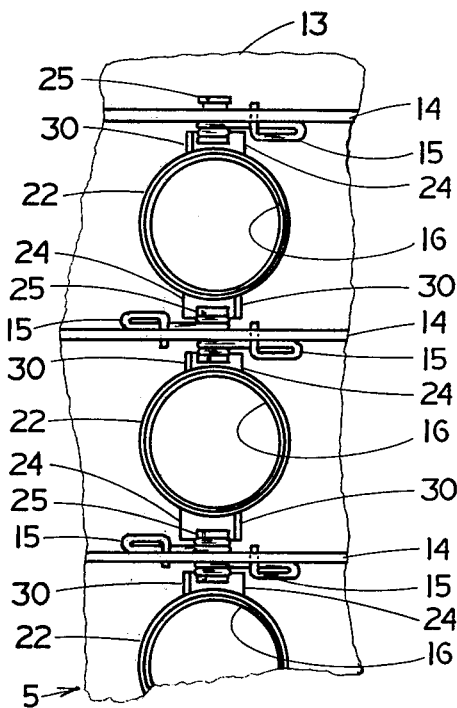
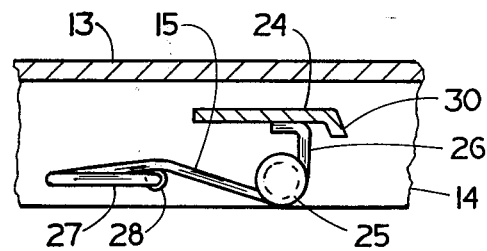
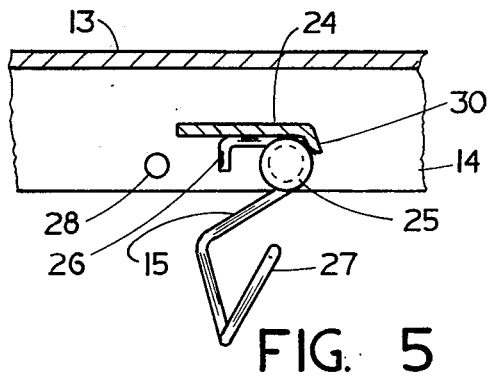

FILTER ARRANGEMENT

BACKGROUND OF THE INVENTION

1. Field of Invention

The present invention relates to gas separation devices and in particular to a filter arrangement adapted to be connected to an apertured header plate member.

2. Description of the Prior Art

The prior art includes a variety of filter arrangements adapted to be releasably secured to an apertured plate member. Typically, each arrangement includes a tubular filter having one end connected to an apertured support plate, a basket or cage disposed within the filter to prevent inadvertent collapse or failure of the filter, and a venturi proximate the end of the filter adapted to receive and direct pulsed gases into the filter during filter cleaning operations. These arrangements have usually required the use of tools to install and remove and have generally been relatively cumbersome and difficult for a workman to handle during repair or replacement of the filters.

SUMMARY OF THE INVENTION

The present invention relates to a gas separation device and in particular to a filter arrangement adapted to be releasably secured to an apertured header plate disposed between the dirty gas inlet and the clean gas outlet of a bag house or related gas filtration system.

The filter arrangement includes a tubular filter surrounded by an attachment collar releasably secured to the header plate and a flow-through mounting member extending through the plate aperture into one end of the filter. The collar, which is releasably secured to the header plate by an easily manipulated bayonet-type clamping arrangement, is sized to retain a portion of the filter about an outwardly protruding annular shoulder on the mounting member between the collar and the plate. Thus, when the collar is secured to the plate it clamps the filter and the mounting member in supporting sealed engagement with the marginal edge of the plate aperture to secure the filter to the plate.

From the foregoing, it can be seen that the invention provides a convenient and easily maintained filter arrangement which permits rapid repair and replacement of the filter media in a gas filtration system, it being understood that various changes can be made in the arrangement, form and construction of the apparatus disclosed herein without departing from the spirit and scope of the invention.

DESCRIPTION OF THE DRAWINGS

FIG. 1 is a side elevational view of a bag house, partially in section, embodying the invention;

FIG. 2 is an enlarged cross-sectional view, partially in section, taken substantially along line 2—2 in FIG. 1 showing the clamping arrangement securing the filter to the header plate;

FIG. 3 is a transverse elevational view, partially in section, taken generally along line 3—3 in FIG. 1;

FIG. 4 is a cross-sectional view taken substantially along line 4—4 in FIG. 3 showing the clamping arrangement in the filter securing position;

FIG. 5 is substantially the same as FIG. 4 but showing the clamping arrangement in the disengaged position.

DESCRIPTION OF THE PREFERRED EMBODIMENT

Figure 6:
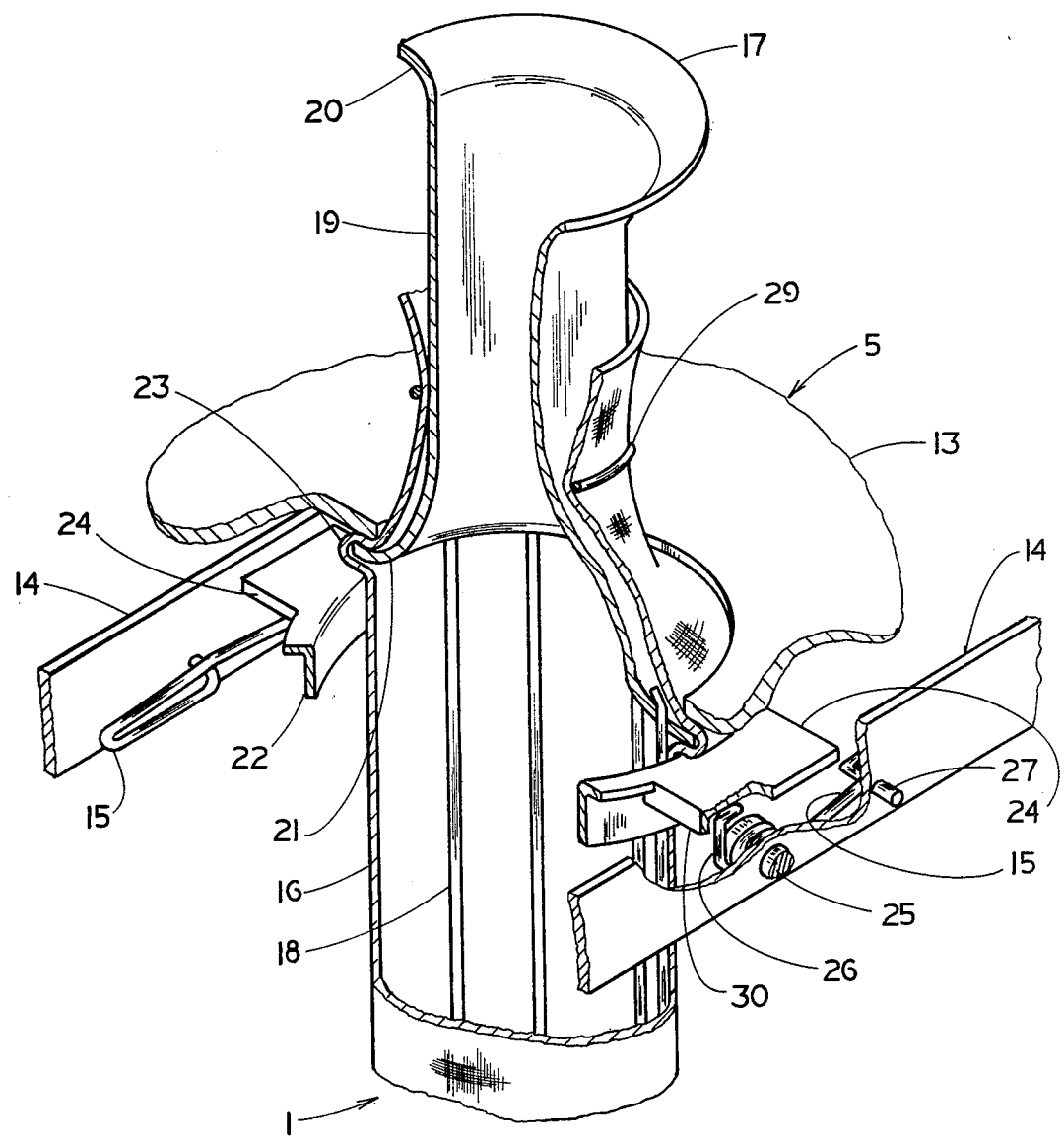
FIG. 6 is an enlarged isometric view, partially in section, showing the filter arrangement mounted on the header plate as shown in FIG. 1.

As shown in FIG. 1, a plurality of tubular filter units 1 embodying the invention are secured in a bag house or filter housing 2 between a dirty gas inlet 3 and a clean gas outlet 4. The bag house 2 includes a transversely extending header plate 5 which divides the bag house into a dirty gas cleaning chamber 6 and a clean gas take-off chamber or plenum 7. As will be described, the header plate 5 supports the tubular filter units 1 within the dirty gas chamber such that when dirty gases are directed through the inlet 3 into the dirty gas chamber 6, they pass through the filter units and leave the bag house through the plenum 7 and clean gas outlet 4. Particulate materials separated from the dirty gases are collected in a suitable hopper 8 positioned below the dirty gas chamber 6, and these materials are in turn removed from the hopper through the discharge outlet 9 as is well known in the art. To accommodate cleaning of the filters, the bag house includes a valve controlled reverse flow flushing arrangement 10. As shown schematically in FIG. 1, the flushing arrangement 10 includes an inlet pipe 11 having air injection nozzles positioned above each of the filter units 1 to inject jets or pulses of air 12 into each filter during filter cleaning operations.

Referring to FIGS. 1-3, the header plate 5 supporting the filter units 1 includes an apertured tube sheet 13 welded or similarly secured to a plurality of stiffening members 14 extending across the housing of the bag house. As will be described, the stiffening members 14 are aligned on opposing sides of each row of plate apertures to rigidify the tube sheet 13 and to support the attachment clips 15 providing a bayonet-like clamping arrangement releasably securing each of the filter units 1 to the header plate 5.

As shown in FIG. 6, each of the filter units 1 includes a tubular filter bag or media 16, a tubular mounting member or venturi member 17 extending through the plate aperture into one end of the filter, and a supporting cage or basket 18 extending generally coextensively within the filter 16 and secured by welding or the like to the venturi member 17. The venturi member 17, which may be made of metal, a thermoplastic, hard rubber or similar material, includes an inwardly recessed throat portion 19 and flared annular shoulders 20 and 21 at the ends of the throat portion 19. The annular shoulder 21 has an outermost diameter at least substantially the same as the plate aperture and is axially positioned within the filter. This arrangement accommodates releasably securing the annular collar 22 about the filter 16 to retain a portion of it between the tube sheet 13 and the collar 22, it being noted that the interior diameter of the collar 22 is sized to be slightly less than the outermost diameter of the shoulder 21 to retain the cloth-like filter media forming a pleat 23 embracing the periphery of the shoulder 21.

The collar 22, which clamps the pleat 23 in sealing engagement with the marginal edge of the plate aperture, is releasably secured to the header plate 5 by the resilient clips 15 which carry the collar through a pair of ears 24 extending from opposing sides of the collar. The clips 15 are preferably formed of spring steel wire or the like coiled around anchoring pins 25 secured to the stiffening members 14. As shown in the drawings, each of the clips 15 includes a camming end portion 26 which engages one of the ears 24 to support the collar, and the other end of the clip is provided with a connecting portion 27 releasably retained in a hole 28 provided in the stiffening member 14 as shown in FIG. 4. Additionally, as can be seen from FIG. 5, the connecting portion 27 is angularly offset from the main body of the clip in its unsecured position so that when a workman secures the clip in its collar clamping position, the resilient clip biases the collar into sealing engagement with the header plate.

From the foregoing, it can be seen that the invention accommodates rapid on-site installation and replacement of the filter media in the bag house. In the typical arrangement the filter units are assembled outside of the bag house; i.e., the filter cage 18 and the venturi member 17 are secured in the filter bag 16 and the collar 22 is entrained about the bag, and, to retain the bag in position while it is being secured in the bag house, a rubber band 29 or the like is provided to gather the filter about the throat portion of the venturi member. Thus, to install the assembled filter units in the bag house, a workman simply aligns each of the units in a respective plate aperture and rotates the collar 22 until the depending stops or flanges 30 on the ears 24 abut the pins 25 as shown in FIG. 5. In this position the pins 25 support the collar 22 which in turn supports the entire unit such that the workman's hands are free to install the remaining filter units for each row of plate apertures in the same fashion. Thereafter, when all of the filter units in the row are installed, each of the filters 16 and its associated venturi member 17 is secured in sealing engagement with the tube sheet 13 by manipulating the clips 15 to entrain the connecting portions 27 in the holes 28 as shown in FIG. 4. In the event it is desired to remove the filter arrangements from the bag house, this procedure is reversed.

I claim:

1. A filter installation for a filter housing having a dirty gas inlet and a clean gas outlet, comprising:
    an apertured header plate including an aperture of a predetermined diameter disposed between the dirty gas inlet and the clean gas outlet;
    a tubular filter;
    a venturi-like member extending through the plate aperture into one end of the filter;
    said member including a tubular throat portion and an outwardly protruding shoulder proximate one end of said throat portion within the filter;
    said shoulder having an outermost diameter at least substantially the same as the diameter of the plate aperture;
    a collar surrounding the filter having an interior diameter less than the outermost diameter of the shoulder;
    said collar retaining a portion of the filter between the plate and the collar to form a pleat in the filter embracing the periphery of said shoulder; and
    attachment means releasably securing the collar to the plate clamping said pleat in sealing engagement with the marginal edge of the plate aperture to secure the filter to the plate.

2. The invention according to claim 1, and
    said attachment means including biasing means urging the collar into yielding engagement with said plate.

3. The invention according to claim 1, and
    said venturi-like member being of an elongated tubular configuration having axially flared end portions, one of said end portions providing said shoulder.

4. The invention according to claim 1, and
    filter support means within the filter being retained by said venturi-like member.

5. The invention according to claim 4, and
    said filter support means being an elongated tubular basket generally contiguous with the interior of the filter and having one end secured to said shoulder.

6. The invention according to claim 1, and
    said header plate including a pair of stiffening members disposed on opposing sides of the plate aperture; and
    said stiffening members carrying said attachment means.

7. The invention according to claim 6, and
    said attachment means including a pair of clips;
    connecting means pivotally securing each of said clips to a respective stiffening member on opposing sides of the plate aperture;
    a camming portion at one end of each clip engageable with the collar to carry it into clamping relation with the header plate upon rotation of the clip; and
    a connecting portion at the other end of each clip releasably couplable with its respective stiffening member to secure the clip in a collar clamping position.

8. The invention according to claim 7, and
    said connecting means being spaced from the header plate to receive and carry the collar in axial alignment with the plate aperture prior to securing the filter to the plate.

9. The invention according to claim 8, and
    said collar including a pair of protruding ear portions extending outwardly from opposing sides of the collar; and
    said ear portions being carried by said connecting means and camming portions.

10. The invention according to claim 8, and
    said collar including stop means cooperative with the connecting means to align said ear portions with the clips prior to securing the filter to the plate.

* * * * *